(12) United States Patent
Onoda et al.

(10) Patent No.: US 11,171,394 B2
(45) Date of Patent: Nov. 9, 2021

(54) LITHIUM ION SECONDARY BATTERY AND BATTERY PACK

(71) Applicant: TOYOTA JIDOSHA KABUSHIKI KAISHA, Toyota (JP)

(72) Inventors: Yusuke Onoda, Toyota (JP); Nobuaki Koiwa, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 15/682,703

(22) Filed: Aug. 22, 2017

(65) Prior Publication Data

US 2018/0062147 A1 Mar. 1, 2018

(30) Foreign Application Priority Data

Aug. 26, 2016 (JP) .............................. JP2016-165591

(51) Int. Cl.
*H01M 2/26* (2006.01)
*H01M 50/538* (2021.01)
(Continued)

(52) U.S. Cl.
CPC ......... *H01M 50/538* (2021.01); *H01M 4/628* (2013.01); *H01M 10/0431* (2013.01);
(Continued)

(58) Field of Classification Search
CPC .............. H01M 2/1673; H01M 2/263; H01M 10/0525; H01M 2/1077; H01M 10/0431;
(Continued)

(56) References Cited

U.S. PATENT DOCUMENTS

2005/0277023 A1* 12/2005 Marple ............... H01M 2/1653
429/221
2009/0169993 A1* 7/2009 Ohashi ................. H01G 9/151
429/209
(Continued)

FOREIGN PATENT DOCUMENTS

CN 104521035 A 4/2015
CN 105322165 A 2/2016
(Continued)

*Primary Examiner* — Jonathan G Jelsma
*Assistant Examiner* — Omar M Kekia
(74) *Attorney, Agent, or Firm* — Sughrue Mion, PLLC

(57) ABSTRACT

The present teaching provides a highly durable lithium ion secondary battery including a flat shape wound electrode body, with which a high capacity retention ratio and suppression of resistance rise are realized, and also provides a battery pack constructed by using the secondary battery as a unit battery. The lithium ion secondary battery (unit battery) provided in accordance with the present teaching has a flat-shaped wound electrode body 20, and in a state in which a constraint pressure is applied in the direction toward the flat surface of the wound electrode body under the same conditions as the conditions when the battery pack is constructed, the condition of a D/B ratio being 1.01 or more and 1.07 or less is satisfied, where, in the lateral cross section of the wound electrode body, a thickness from an inner curve apex V to an outer curve apex P is taken as a center thickness D of a curved R portion, and a thickness from the inner curve apex V to an outer surface S of the wound electrode body along an R portion/F portion boundary line W is taken as a boundary thickness B of the curved R portion.

8 Claims, 4 Drawing Sheets

(51) Int. Cl.
*H01M 10/04* (2006.01)
*H01M 10/42* (2006.01)
*H01M 10/0587* (2010.01)
*H01M 4/62* (2006.01)
*H01M 50/20* (2021.01)
*H01M 50/46* (2021.01)
*H01M 10/0525* (2010.01)

(52) U.S. Cl.
CPC ... *H01M 10/0587* (2013.01); *H01M 10/4235* (2013.01); *H01M 50/20* (2021.01); *H01M 50/46* (2021.01); *H01M 10/0525* (2013.01); *H01M 2220/20* (2013.01); *Y02E 60/10* (2013.01)

(58) Field of Classification Search
CPC ......... H01M 10/0587; H01M 10/4235; H01M 2220/20; H01M 4/628; H01M 50/538; H01M 50/46; H01M 50/20; H01M 10/647; Y02E 60/122; Y02E 60/10
USPC .......................................................... 429/94
See application file for complete search history.

(56) References Cited

U.S. PATENT DOCUMENTS

| | | | | |
|---|---|---|---|---|
| 2015/0010784 | A1* | 1/2015 | Takahata | H01M 10/0525 429/7 |
| 2015/0180007 | A1* | 6/2015 | Ohta | H01M 2/06 429/179 |
| 2015/0180036 | A1* | 6/2015 | Takebayashi | H01M 4/13 429/319 |
| 2015/0280209 | A1* | 10/2015 | Ohara | H01M 10/0587 429/94 |
| 2016/0036046 | A1 | 2/2016 | Takebayashi | |
| 2016/0049685 | A1 | 2/2016 | Sasaki et al. | |

FOREIGN PATENT DOCUMENTS

| | | |
|---|---|---|
| CN | 105375054 A | 3/2016 |
| JP | 2006-278184 A | 10/2006 |
| JP | 2014103098 A | 6/2014 |
| JP | 2016-42433 A | 3/2016 |
| JP | 5923431 B2 | 5/2016 |
| KR | 10-2016-0016685 A | 2/2016 |

\* cited by examiner

[Fig. 1]
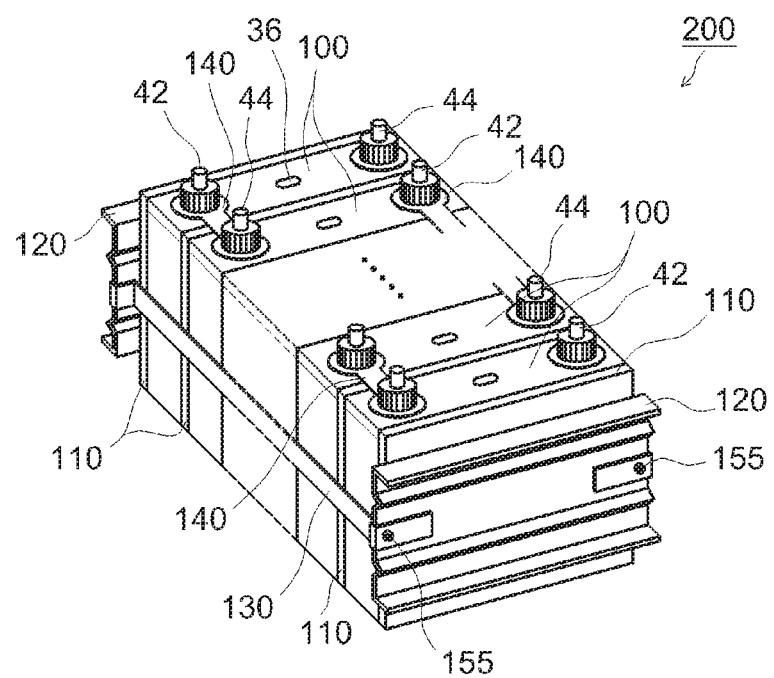

[Fig. 2]
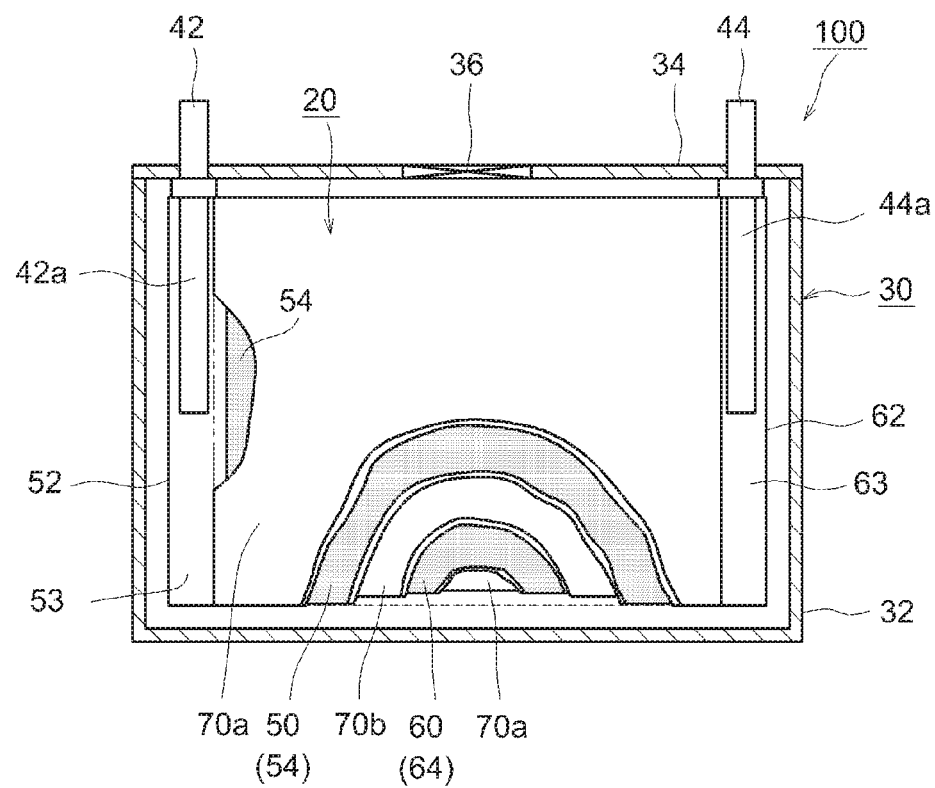

[Fig. 3]
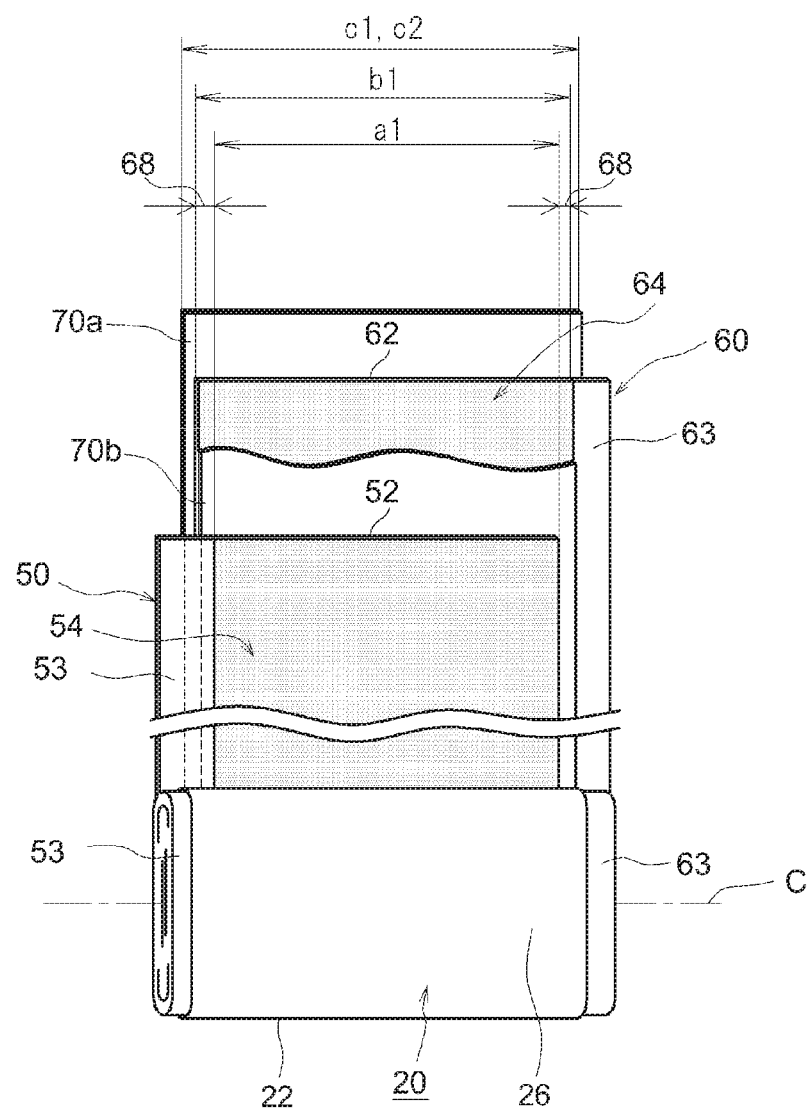

[Fig. 4]
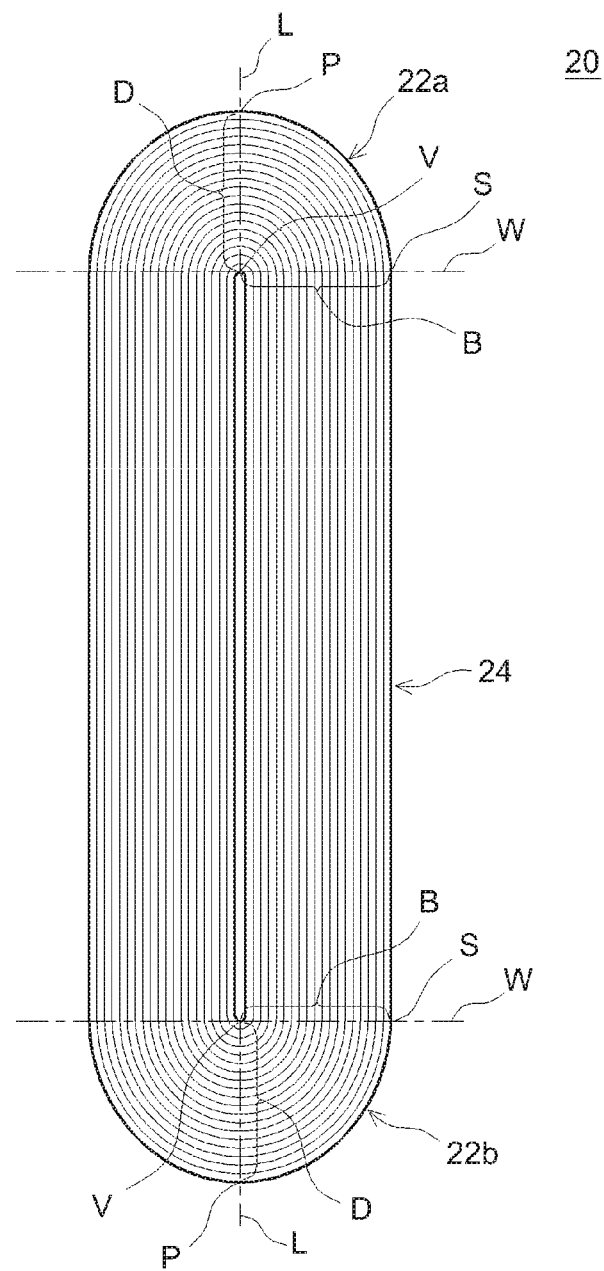

LITHIUM ION SECONDARY BATTERY AND BATTERY PACK

BACKGROUND OF THE INVENTION

1. Field of the Invention

The present teaching relates to a lithium ion secondary battery including a flat-shaped wound electrode body and to a battery pack in which a plurality of the secondary batteries (unit batteries) are arranged in a constrained state. It should be noted that the present application claims priority based on Japanese Patent Application No. 2016-165591 filed on Aug. 26, 2016, the entire contents of which is hereby incorporated by reference.

2. Description of the Related Art

Because lithium ion secondary batteries are lightweight and make it possible to obtain a high energy density, the importance thereof as high-output driving power supplies which are mounted on vehicles (EV, HV, PHV, and the like) and power supplies used for personal computers, mobile terminals, and other electric devices has been growing.

Typical examples of this type of lithium ion secondary battery include the so-called prismatic lithium ion secondary battery in which a wound electrode body obtained by laminating long positive and negative electrode sheets and a separator sheet that electrically isolates the positive and negative electrode sheets from each other, and winding the laminate in the longitudinal direction in a flat shape, is accommodated in a battery case of a corresponding flat-shaped rectangular parallelepiped shape. For example, Japanese Patent No. 5923431 and Japanese Patent Application Publication No. 2006-278184 each describe a configuration example of a wound electrode body to be provided to a lithium ion secondary battery having a prismatic outer shape with a case.

A battery pack formed by arranging a plurality of prismatic lithium ion secondary batteries (unit batteries) so that the wide sides of the battery cases corresponding to the wide flat surfaces of the wound electrode bodies face each other, and applying a constraint pressure in the arrangement direction to constrain the plurality of unit batteries has been mounted on a vehicle and advantageously used as a high-output driving power supply.

In recent years, a demand for higher performance of EV, HV and PHV has been growing, and a demand has accordingly been created for higher performance of lithium ion secondary batteries as driving power supplies.

As a means for realizing high performance of such a lithium ion secondary battery, a positive electrode is used which has a positive electrode active material layer including a high-potential positive electrode active material such that the open circuit voltage (OCV) by a lithium metal standard (vs. Li/Li$^+$) is 4.3 V or more, such a positive electrode ensuring higher performance.

Furthermore, an inorganic phosphate such as lithium phosphate can be included in the positive electrode active material layer having such a high-potential positive electrode active material layer. By including an inorganic phosphate in the positive electrode active material layer, it is possible to prevent a transition metal from eluting from the positive electrode active material due to acid generation accompanying oxidative decomposition of a nonaqueous electrolytic solution (that is, the inorganic phosphate functions as an acid consuming material), thereby suppressing capacity deterioration.

SUMMARY OF THE INVENTION

The inventors of the present teaching have conducted detailed investigation of the form (for example, the state of winding) of a flat-shaped wound electrode body provided with a positive electrode having a positive electrode active material layer including a high-potential positive electrode active material and an inorganic phosphate. The results obtained have indicated that in the flat-shaped wound electrode body provided with a positive electrode having the positive electrode active material layer including the inorganic phosphate, a difference in durability performance of the lithium ion secondary battery including the wound electrode body can be created depending on the state of winding. It was also found that by properly controlling the state of winding of the wound electrode body, it is possible to realize a high capacity retention ratio and suppress an increase in battery internal resistance, regardless of the presence of the phosphate. These findings led to the creation of the present teaching. Thus, it is an object of the present teaching to provide a highly durable lithium ion secondary battery provided with a flat-shaped wound electrode body with which a high capacity retention ratio and suppression of a rise in resistance are realized regardless of the presence of an inorganic phosphate by optimizing the state of winding, while maintaining the performance-wise advantage of providing a positive electrode including the inorganic phosphate, and also to provide a battery pack constructed by using such a secondary battery as a unit battery.

In order to achieve the abovementioned object, the present teaching provides a battery pack including a plurality of lithium ion secondary batteries arranged in a predetermined direction and constrained in a state in which a constraint pressure is applied in the arrangement direction, and also to provide a lithium ion secondary battery (unit battery) constituting the battery pack.

Each of the unit batteries constituting the battery pack disclosed herein, that is, each of the plurality of lithium ion secondary batteries, includes:

a flat shaped wound electrode body in which a sheet-shaped positive electrode including a positive electrode active material layer on an elongated positive electrode current collector, a sheet-shaped negative electrode including a negative electrode active material layer on an elongated negative electrode current collector, and an elongated separator sheet that electrically insulates the sheet-shaped positive and negative electrodes from each other are laminated and wound in a longitudinal direction;

a nonaqueous electrolytic solution; and a battery case of a rectangular parallelepiped shape corresponding to the flat shape of the wound electrode body.

Further, the positive electrode active material layer includes a positive electrode active material and at least one inorganic phosphate as a compound different from the positive electrode active material.

Furthermore, the wound electrode body is constituted, in a lateral cross section of the electrode body orthogonal to a winding central axis, by two curved R portions enclosing respective curved outer surfaces at both ends and a flat F portion enclosing a flat outer surface located between the two curved R portions.

In the battery pack disclosed herein, the plurality of the lithium ion secondary batteries of such a configuration are constrained in a state in which the wound electrode body and the nonaqueous electrolytic solution are accommodated in the battery case of each battery, the batteries are arranged so that the flat surfaces of the wound electrode bodies inside the cases face each other, and the constraint pressure is applied in the arrangement direction.

In each of the constrained lithium ion secondary batteries constituting the battery pack disclosed herein, when, in the lateral cross section of the wound electrode body, a straight line connecting outer curve apexes P located on respective outer surfaces of the two curved R portions is defined as a flat center line L, and a straight line which is orthogonal to the flat center line L and passes through an inner curve apex V of the positive electrode or the negative electrode, the inner curve apex V being on the innermost side of each of the two curved R portions, is defined as an R portion/F portion boundary line W (see the below-described FIG. 4), the following condition is satisfied:

a D/B ratio is 1.01 or more and 1.07 or less, where, in the lateral cross section of the wound electrode body, a thickness from the inner curve apex V to the outer curve apex P is taken as a center thickness D of the curved R portion, and a thickness from the inner curve apex V to an outer surface S of the wound electrode body along the R portion/F portion boundary line W is taken as a boundary thickness B of the curved R portion.

In other words, in the lithium ion secondary battery (unit battery) provided for constituting the battery pack disclosed herein, in a state in which the wound electrode body and the nonaqueous electrolytic solution are accommodated in the battery case and a constraint pressure is applied from the outside of a case side surface facing the flat surface of the wound electrode body in the direction toward the flat surface under the same conditions as the conditions when the battery pack is constructed, the condition of a D/B ratio being 1.01 or more and 1.07 or less is satisfied.

The inventors of the present teaching have investigated in detail the state of winding of the wound electrode body accommodated inside a unit battery in a constrained state in which a predetermined constraint pressure is applied in a battery pack including a plurality of prismatic lithium ion secondary batteries each having the wound electrode body of the above configuration and serving as a unit battery. It was found that by changing the state of winding between the center thickness D and the boundary thickness B in the curved R portion and adjusting the center thickness D and the boundary thickness B in the curved R portion to a ratio within a predetermined range, it is possible to maintain a high capacity retention ratio and suppresses an increase in battery internal resistance even when an inorganic phosphate is included in the positive electrode active material layer.

Thus, with the battery pack in which the D/B ratio is 1.01 or more and 1.07 or less in the abovementioned condition and with a lithium ion secondary battery for such a battery pack structure, it is possible maintain the capacity retention ratio, suppress a resistance rise rate, and increase durability even when an inorganic phosphate is included in the positive electrode active material layer.

In a desired embodiment, the D/B ratio is 1.01 or more and 1.04 or less. By adjusting the D/B ratio to such a range, a higher capacity retention ratio can be realized.

In another desired embodiment, the positive electrode active material layer includes a high-potential positive electrode active material having an open circuit voltage (OCV) of 4.3 V or higher as a positive electrode active material.

In the battery pack and the lithium ion secondary battery (unit battery) having such a configuration, a high voltage of the battery can be realized by including the high-potential positive electrode active material, and when a nonaqueous electrolyte is oxidatively decomposed, the transition metal is prevented from eluting from the high-potential positive electrode active material due to the presence of the inorganic phosphate (acid consuming material) and the adjustment of the D/B ratio. Therefore, it is possible to provide a high-potential battery pack with high durability in which a high capacity retention ratio is realized.

BRIEF DESCRIPTION OF THE DRAWINGS

FIG. 1 is a perspective view showing the configuration of a battery pack according to one embodiment;

FIG. 2 is a diagram schematically showing the internal configuration of a unit battery (lithium ion secondary battery) according to one embodiment;

FIG. 3 is a schematic diagram showing the configuration of a wound electrode body according to one embodiment; and FIG. 4 is an explanatory view schematically showing a lateral cross section of a wound electrode body according to one embodiment.

DESCRIPTION OF THE PREFERRED EMBODIMENTS

The desired embodiment of the battery pack disclosed herein and the lithium ion secondary battery advantageous as a unit battery will be described hereinbelow in detail with reference to the drawings. Matters that are not mentioned in the present specification but are necessary for implementation can be grasped as design matters by a person skilled in the art on the basis of the prior art in the relevant field. The present teaching can be implemented based on the contents disclosed in this specification and common technical sense in the relevant field. In the description of numerical ranges in the present specification: A to B (A and B are specific numerical values) indicate A or more and B or less.

First, an example of a lithium ion secondary battery 100 as a unit battery and an example of a battery pack 200 including a plurality of such batteries (typically, a battery pack in which a plurality of unit batteries are connected in series) are explained with reference to FIGS. 1 to 3.

As shown in FIG. 2, in the lithium ion secondary battery 100X) according to the present embodiment, mainly a flat-shaped wound electrode body 20 and a nonaqueous electrolytic solution (not shown in the figure) are accommodated in a battery case 30. The battery case 30 is configured of a case main body 32 having a prismatic shape (that is, a bottomed rectangular parallelepiped shape) having an opening at one end (corresponds to an upper end portion in a usual use state of the battery) and a lid 34 for sealing the opening of the case main body 32. The case main body 32 can accommodate the wound electrode body 20 via the opening at the top thereof.

As shown in the figure, a positive electrode terminal 42 and a negative electrode terminal 44 for external connection are provided on the lid 34 so that a part of each terminal protrudes from the lid 34 to the outside of the battery 100. The below-described positive electrode current collector plate 42a and negative electrode current collector plate 44a are connected to the positive electrode terminal 42 and the negative electrode terminal 44, respectively.

Further, the lid 34 is provided with a safety valve 36 for discharging the gas generated inside the battery case 30 to the outside of the battery case and a pouring port (not shown in the figure) for pouring the nonaqueous electrolytic solution into the battery case 30. The material of the battery case 30 is desirably a metal material such as aluminum, an aluminum alloy, and stainless steel, or a resin material.

The lithium ion secondary battery 100 having such a configuration can be constructed, for example, by welding the wound electrode body 20 to the positive electrode terminal 42 and the negative electrode terminal 44 which are formed integrally with the lid 34, attaching and welding the lid 34 to the opening of the case main body 32 while accommodating the wound electrode body 20 inside the case main body 32 from the opening thereof, then pouring the nonaqueous electrolytic solution from the pouring port provided in the lid 34, and then sealing the pouring port with a predetermined sealing member. Since the process of building the lithium ion secondary battery itself may be a conventional process and does not characterize the present teaching, further detailed explanation thereof will be omitted.

As shown in FIG. 3, the wound electrode body 20 is obtained by laminating an elongated sheet-shaped positive electrode 50 and an elongated sheet-shaped negative electrode 60, with two also elongated sheet-shaped separators 70a and 70b being interposed therebetween, and winding the laminate. From the viewpoint of reliably insulating the surface of the wound electrode body 20 from the inner wall of the battery case 30, it is desired that, as shown in FIG. 3, the outermost periphery of the wound electrode body 20 be the separator 70a (that is, the negative electrode 60 located on the outermost peripheral side in the body 20 is covered with the separator 70a).

As shown in FIG. 3, in the positive electrode 50, a positive electrode active material layer 54 is formed on both surfaces of the elongated sheet-shaped positive electrode current collector 52 along the longitudinal direction of the sheet, while in the negative electrode 60, a negative electrode active material layer 64 is formed on both surfaces of the elongated sheet-shaped negative electrode current collector 62 along the longitudinal direction of the sheet.

Typically, with consideration for occlusion and release of charge carriers, it is desired that the negative electrode active material layer 64 and the positive electrode active material layer 54 be formed so that, as shown in the figure, a size b1 of the negative electrode active material layer 64 in the width direction orthogonal to the longitudinal direction is larger than a size a1 of the positive electrode active material layer 54 in the width direction orthogonal to the longitudinal direction (b1>a1). Further, it is desired that the sizes c1, c2 of the separators 70a, 70b in the width direction orthogonal to the longitudinal direction be set to be larger than the sizes in the width direction of the positive electrode active material layer 54 and the negative electrode active material layer 64 in order to insulate reliably the positive electrode active material layer 54 and the negative electrode active material layer 64 (typically, c1 and c2>b1>a1).

Further, as shown in FIG. 3, the winding termination end of at least one (separator 70a) of the two separators 70a. 70b is disposed at a position advanced in the winding direction from the negative electrode winding termination end. As a result, an excess portion that does not contact either the positive electrode 50 or the negative electrode 60 is formed by a part of the separator 70a protruding in the winding direction from the negative electrode winding termination end.

As shown in FIG. 3, the positive electrode 50 and the negative electrode 60 overlap so that both ends of the negative electrode active material layer 64 in the width direction are positioned on the outer side in the direction of the winding axis C with respect to both ends of the positive electrode active material layer 54 in the width direction. In other words, on both ends of the negative electrode active material layer 64 in the width direction, there is a positive electrode active material layer non-facing portion 68 that does not face the positive electrode active material layer 54. Typically, the separators 70a, 70b are overlapped so as to cover the positive electrode active material layer 54 and the negative electrode active material layer 64 in the width direction orthogonal to the longitudinal direction of the sheet.

Further, as shown in FIG. 2, at one end of the positive electrode current collector 52 in the width direction orthogonal to the longitudinal direction of the sheet, a positive electrode current collector exposed end portion 53, which does not have the positive electrode active material layer 54, is formed in a stripe shape along the longitudinal direction of the sheet. Likewise, at the other end portion of the negative electrode current collector 62 in the width direction, a negative electrode current collector exposed end portion 63, which does not have the negative electrode active material layer 64, is formed in a stripe shape along the longitudinal direction of the sheet. The positive electrode current collector plate 42a and the negative electrode current collector plate 44a are welded to the positive and negative electrode current collector exposed end portions 53 and 63, respectively. As a result, the positive electrode 50 and the negative electrode 60 of the wound electrode body 20 are electrically connected to the positive electrode terminal 42 and the negative electrode terminal 44 through the positive electrode current collector plate 42a and the negative electrode current collector plate 44a, respectively.

As the materials and members constituting the wound electrode body 20, the same as those used in the typical conventional general lithium ion secondary batteries can be used without limitation.

For example, as the positive electrode current collector 52, those used as the positive electrode current collector 52 of lithium ion secondary batteries of this kind can be used without particular limitation. Typically, a positive electrode current collector 52 made of a metal having good electric conductivity is desirable. For example, the positive electrode current collector is configured of a metal material such as aluminum, nickel, titanium, and stainless steel. Aluminum (for example, an aluminum foil) is particularly desirable. The thickness of the positive electrode current collector 52 is not particularly limited, but from the standpoint of balance between the capacity density of the battery and the strength of the current collector, the appropriate thickness is about 5 μm or more and 50 μm or less, and the desired thickness is about 8 μm or more and 30 μm or less.

As the positive electrode active material, for example, a lithium composite metal oxide (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, and $LiFePO_4$) having a layered structure or a spinel structure can be used. For example, a LiNiCoMn composite oxide (for example, $LiNi_{1/3}Co_{1/3}Mn_{1/3}O_2$) is a desirable example because such an oxide has high thermal stability and high energy density.

Alternatively, a lithium manganese composite oxide having a spinel structure represented by the general formula: $Li_pMn_{2-q}M_qO_{4+\alpha}$, is a desired example. Here, p satisfies the condition $0.9 \leq p \leq 1.2$; q satisfies the condition $0 \leq q < 2$, typically $0 \leq q \leq 1$ (for example, $0.2 \leq q \leq 0.6$); and a is a value determined so as to satisfy the charge neutrality condition when $-0.2 \leq \alpha \leq 0.2$. When q is larger than 0 (0<q), M can be one or two or more selected from any metal element other than Mn or a non-metal element. More specifically, it is possible to use a metal such as Na, Mg, Ca, Sr, Ti, Zr, V, Nb, Cr, Mo, Fe, Co, Rh, Ni, Pd, Pt, Cu, Zn, B, Al, Ga, In, Sn, La, W, and Ce. Among them, at least one transition metal element such as Fe, Co, and Ni can be advantageously used. Specific examples include $LiMn_2O_4$, $LiCrMnO_4$, and the like.

Among these, spinel positive electrode active materials including Li, Ni, and Mn as essential elements are desirable. Such materials can be specifically exemplified by lithium nickel manganese composite oxides having a spinel structure represented by the general formula: $Li_x(Ni_yMn_{2-y-z}M1_z)O_{4+\beta}$. Here, M1 can be absent or can be an arbitrary metal element other than Ni and Mn or a typical transition metal element (for example, one or two or more selected from Fe, Co, Cu. Cr, Zn, and Al). Among them, M desirably includes at least one of trivalent Fe and Co. Alternatively, it may be a semi-metallic element (for example, one or two or more selected from B. Si, and Ge) or a nonmetallic element. Also, x satisfies the condition $0.9 \leq x \leq 1.2$; y satisfies the condition $0<y$; z satisfies the condition $0 \leq z$; $y+z<2$ (typically, $y+z \leq 1$); and β can be the same as a above. In one desired embodiment, y satisfies the condition $0.2 \leq y \leq 1.0$ (more desirably $0.4 \leq y \leq 0.6$, for example, $0.45 \leq y \leq 0.55$); z satisfies the condition $0 \leq z < 1.0$ (for example, $0 \leq z \leq 0.3$). A particularly desirable specific example is $LiNi_{0.5}Mn_{1.5}O_4$ and the like.

Such a positive electrode active material is desired because it can be a high-potential positive electrode active material which can realize an open circuit voltage (OCV) by the lithium metal standard (vs. $Li/Li^+$) of 4.3 V or more.

The positive electrode active material layer may include components other than the abovementioned positive electrode active material, for example, an electrically conductive material and a binder. Carbon black such as acetylene black (AB) or other carbon materials (graphite and the like) can be advantageously used as the electrically conductive material. Polyvinylidene fluoride (PVDF) and the like can be used as the binder.

The thickness of the positive electrode active material layer 54 is, for example, 10 μm or more (typically 50 μm or more) and 200 μm or less (typically 100 μm or less). Although the density of the positive electrode active material layer 54 is not particularly limited, it can be, for example, 1.5 g/cm³ or more (typically 2 g/cm³ or more) and 4.5 g/cm³ or less (typically 4.2 g/cm³ or less). The positive electrode active material layer 54 having such a form can realize high battery performance (for example, high energy density and output density).

Such a positive electrode active material layer 54 can be formed by dispersing a positive electrode active material and optional materials (an electrically conductive material, a binder, and the like) in an appropriate solvent (for example, N-methyl-2-pyrrolidone: NMP) to prepare a paste-like (or slurry-like) composition, applying an appropriate amount of the composition to the surface of the positive electrode current collector 52, and drying. Further, by appropriately performing press treatment as needed, it is possible to adjust the properties (for example, average thickness, density, and porosity) of the positive electrode active material layer 54.

Meanwhile, as the negative electrode current collector 62, those used as the negative electrode current collector 62 of lithium ion secondary batteries of this kind can be used without particular limitation. Typically, a negative electrode current collector 62 made of a metal having good electric conductivity is desirable. For example, copper (for example, a copper foil) or an alloy mainly including copper can be used. The thickness of the negative electrode current collector 62 is not particularly limited, but from the standpoint of balance between the capacity density of the battery and the strength of the current collector, the appropriate thickness is about 5 μm or more and 50 μm or less, and the desired thickness is about 8 μm or more and 30 μm or less.

As the negative electrode active material, one or two or more materials conventionally used for lithium ion secondary batteries can be used without particular limitation. Such materials are exemplified by a particulate (or spherical or flaky) carbon material including a graphite structure (layered structure) in at least a part thereof, a lithium transition metal composite oxide (for example, a lithium titanium composite oxide such as $Li_4Ti_5O_{12}$), and a lithium transition metal composite nitride. Examples of the carbon material include natural graphite, man-made graphite (artificial graphite), non-graphitizable carbon (hard carbon), and easily graphitizable carbon (soft carbon). Alternatively, it may be a carbon particle in the form of a graphite particle as a core covered (coated) with a non-crystalline (amorphous) carbon material.

In addition to the negative electrode active material, the negative electrode active material layer 64 may contain, as necessary, optional components such as a binding material (binder) and a thickener.

As the binder and thickener, those conventionally used in the negative electrode of a lithium ion secondary battery of this kind can be suitably used. For example, a styrene butadiene rubber (SBR) may be advantageously used as a binder, and carboxymethyl cellulose (CMC) may be advantageously used as a thickener.

The thickness of the negative electrode active material layer 64 is, for example, 20 μm or more (typically 50 m or more), desirably 200 μm or less (typically 100 μm or less). Although the density of the negative electrode active material layer 64 is not particularly limited, it is desirably, for example, about 0.5 g/cm³ or more and 2 g/cm³ or less (typically 1 g/cm³ or more and 1.5 g/cm³ or less).

Such a negative electrode active material layer 64 can be formed by dispersing a negative electrode active material and optional materials (binder and the like) in an appropriate solvent (for example, ion exchanged water) to prepare a paste-like (or slurry-like) composition, applying an appropriate amount of the composition to the surface of the negative electrode current collector 62, and drying. Further, by appropriately performing press treatment as needed, it is possible to adjust the properties (for example, average thickness, density, and porosity) of the negative electrode active material layer 64.

As the separators 70a and 70b, the conventional publicly known microporous sheets can be used without particular limitation. For example, a porous resin sheet (film, nonwoven fabric, and the like) made of a resin such as polyethylene (PE) and polypropylene (PP) can be used. Such a porous resin sheet may have a single-layer structure or multilayer structure including two or more layers (for example, a three-layer structure in which a PP layer is laminated on both surfaces of a PE layer). Further, the separator may also have the configuration in which a porous heat-resistant layer is provided on one side or both sides of a porous resin sheet. This heat-resistant layer may be, for example, a layer including an inorganic filler and a binder. As the inorganic filler, for example, alumina, boehmite, and silica can be desirably used. The thickness of such a separator is desirably set, for example, within a range of about 10 μm or more and 40 μm or less.

The size of the wound electrode body 20 is not particularly limited. Exemplifying the desired ranges, the length in the direction of the winding axis C is typically 80 to 200 mm (for example, 120 to 150 mm), the length of the arc of the curved surface (outer surface) of the below-described curved R portions 22a and 22b can be advantageously set within a range of 10 to 40 mm, and the length from the apex P of one curved R portion 22a to the apex P of the other curved R portion 22b, which is a direction orthogonal to the winding axis C, can be advantageously set within a range of 50 to 120 mm.

Further, the winding number (the number of turns or number of revolutions) of the wound electrode body 20 is not particularly limited. The desired range can be exemplified by 20 to 50 turns (particularly desirably, 25 to 39 turns). At this time, it is desirable that winding be performed so that the winding tension (namely, tension) applied to the separators 70a, 70b in the wound electrode body 20 be in a range of approximately 0.35 to 4.3 N/mm$^2$. Further, where winding is performed while appropriately adjusting the winding tension, the D/B ratio can be easily controlled by adjusting the constraint pressure after construction of the battery pack. Here, the "winding tension" is a force (tension) pulling the separator in the longitudinal direction, and can be understood as, for example, a force acting perpendicularly to the cut surface of the separator sheet in the direction of the winding axis C. Further, the flat-shaped wound electrode body 20 is formed, for example, by winding a laminate obtained by laminating the positive and negative electrodes 50 and 60 and the separators 70a and 70b around a winding core (not shown in the figure) having a flat cross section orthogonal to the direction of the winding axis C, or winding the laminate into a cylindrical shape, and then pressing and flattening the wound laminate from the side surface direction to obtain a flat shape.

The process for fabricating the wound electrode body itself is publicly known, and a person skilled in the art can adjust the state of winding (for example, the degree of contraction of the wound electrode body and the proportion of the flat F portion and the curved R portions) by appropriately setting the conditions of the process. Further, in the wound electrode body 20 disclosed herein, the forms of the curved R portions 22a. 22b and the flat F portion 24 of the wound electrode body 20 are defined so that the D/B ratio falls within the above range. This will be described hereinbelow.

The nonaqueous electrolytic solution accommodated together with the wound electrode body 20 in the battery case 30 includes a supporting salt in an appropriate nonaqueous solvent, and conventional well-known nonaqueous electrolytic solutions for lithium ion secondary batteries can be used without particular limitation. For example, ethylene carbonate (EC), diethyl carbonate (DEC), dimethyl carbonate (DMC), and ethyl methyl carbonate (EMC) can be used as the nonaqueous solvent. For example, a lithium salt such as LiPF$_6$ can be advantageously used as the supporting salt.

In addition to the nonaqueous solvent and the supporting salt, various additives (for example, a film forming material) can be added to the nonaqueous electrolytic solution. For example, a lithium salt having an oxalato complex such as lithium bis(oxalato)borate (LiB(C$_2$O$_4$)$_2$), LiBF$_2$(C$_2$O$_4$), LiPF$_2$(C$_2$O$_4$) as an anion, lithium difluorophosphate (LiPO$_2$F$_2$), vinylene carbonate (VC), vinyl ethylene carbonate (VEC), fluoroethylene carbonate (FEC), ethylene sulfite (ES), propane sultone (PS), and lithium bis(trifluoromethanesulfonyl)imide (LiTFSI) can be added. These additives can be used singly or in combination of two or more thereof. The concentration of the additive in the nonaqueous electrolytic solution is desirably such that 5% to 90% of the additive is dissolved in the nonaqueous electrolytic solution when the critical dissolution amount of each additive in the nonaqueous solvent to be used is taken as 100%. Typically, in the case of using (LiB(C$_2$O$_4$)$_2$) or LiPO$_2$F$_2$, it is desirable to adjust the concentration to a range of 0.01 mol/L or more and 0.2 mol/L or less. For example, these additives can be added so that the concentration of each additive in the nonaqueous electrolytic solution is 0.01 mol/L or more and 0.1 mol/L or less.

Then, a battery pack is constructed using the lithium ion secondary battery 100 of the above-described configuration as a unit battery.

As schematically shown in FIG. 1, in the battery pack 200, a plurality (typically 10 or more, desirably about 10 to 50) of lithium ion secondary batteries (unit batteries) 100 are arranged in a direction such that wide surfaces of the battery cases 30 (that is, the case side surfaces facing the flat surfaces of the wound electrode bodies 20 located inside the battery cases) face each other, in other words, a direction such that the flat surfaces of the wound electrode bodies 20 in the battery cases 30 face each other, while the positive electrode terminals 42 and the negative electrode terminals 44 are reversed one by one so as to be disposed alternately. In the present embodiment, interval holding plates (spacers) 110 having a predetermined shape are sandwiched between the arranged lithium ion secondary batteries (unit batteries) 100, but these interval holding plates are not particularly essential components. It is desirable that the interval holding plates 110 be made of a material and/or in a shape enabling each interval holding plate to function as a heat radiating member for efficiently dissipating the heat generated in each unit battery 100 at the time of use. For example, each interval holding plate has a shape enabling the introduction of a cooling fluid (typically air) between the unit batteries 100 (for example, a shape in which a plurality of parallel grooves extending vertically from one side of a rectangular cooling plate to the opposing side are provided on a surface). A cold plate made of a metal having good thermal conductivity or of lightweight and hard polypropylene or other synthetic resin can be also advantageously used.

A pair of end plates (constraint plates) 120 is disposed at both ends of the unit batteries 100 and the interval holding plates 110 arranged as described above. The arranged unit batteries 100 and interval holding plates 110 are constrained by a constraint band 130 for tightening which is attached so as to bridge the end plates 120, the constraining being such that a predetermined constraint pressure is applied in the arrangement direction of the unit batteries. Thus, the unit batteries are constrained so that a constraint pressure is applied to the flat surfaces of the flat-shaped wound electrode bodies 20, which are provided in the unit batteries, in a direction orthogonal to the flat surfaces.

More specifically, by fastening and fixing the end portions of the constraint band 130 to the end plate 120 with screws 155, the unit batteries 100 and the like are constrained so that a predetermined constraint pressure is applied in the arrangement direction of the batteries. In the present embodiment, since the interval holding plates 110 are disposed between the adjacent unit batteries 100, the portions of the wide surfaces of the battery cases 30 of the unit batteries that are in contact with the interval holding plates 110 are pressed by the interval holding plates 110 at the time of constraining. The size of the wide surface (constraint surface) of the interval holding plate 110 that is in contact with the battery case 30 of the unit battery can be set to be equal to the size of the flat surface of the wound electrode body 20 provided in each unit battery 100.

Between the adjacent unit batteries 100, one positive electrode terminal 42 and the other negative electrode terminal 44 are electrically connected by a connecting member (bus bar) 140. By connecting the unit batteries 100 in series in this manner, the battery pack 200 with a desired voltage is constructed.

The constraint pressure that constraints the unit batteries is not particularly limited and can be appropriately set for the purpose of physically maintaining the form of the battery pack, maintaining the target battery performance, and the like. Although not particularly limited, the constraint pressure can be set to be 0.2 MPa or more (more desirably, 0.5 MPa or more) and 10 MPa or less (more desirably, 5 MPa or less). The constraint pressure may vary depending on the shape and size of the unit batteries constituting the battery pack, the material and thickness of the battery case, or the shape of the wound electrode body, but in the battery pack disclosed herein, it is desirable to set and adjust the level of the constraint pressure so that the D/B ratio is maintained in the predetermined range.

The D/B ratio for realizing the battery pack disclosed herein and the unit batteries constituting the battery pack will be described hereinbelow with reference to the drawings.

As described hereinabove, the lithium ion secondary battery 100, which is a unit battery constituting the battery pack disclosed herein, is configured such that in relation to the state of the wound electrode body 20 accommodated in the battery case 30, the D/B ratio is 1.01 or more and 1.07 or less (more desirably, 1.01 or more and 1.04 or less) in a state in which a constraint pressure is applied, that is, in a state in which a constraint pressure is applied from the outside of a case side surface facing the flat surface of the wound electrode body 20 in the direction toward the flat surface under the same conditions as those when the battery pack is constructed, this being a state in which the wound electrode body 20 and the nonaqueous electrolytic solution are accommodated in the battery case 30.

Specifically, as shown in FIG. 4, in the lateral cross section orthogonal to the winding axis C, the wound electrode body 20 is configured of two curved R portions 22a and 22b enclosing respective curved outer surfaces at both ends and a flat F portion 24 enclosing a flat outer surface located between the two curved R portions 22a and 22b.

At this time, a straight line connecting outer curve apexes P located on the respective outer surfaces of the two curved R portions 22a, 22b is defined as a flat center line L, and a straight line which is orthogonal to the flat center line L and passes through the inner curve apex V of the positive electrode or the negative electrode, the inner curve apex V being on the innermost side of each of the two curved R portions 22a and 22b, is defined as an R portion/F portion boundary line W.

Further, where a thickness from the inner curve apex V to the outer curve apex P (in other words, the distance between V and P) is taken as a center thickness D of the curved R portion, and a thickness from the inner curve apex V to the outer surface S of the wound electrode body 20 along the R portion/F portion boundary line W (in other words, the distance between V and S) is taken as a boundary thickness B of the curved R portion, the D/B ratio is set to be 1.01 or more and 1.07 or less (more desirably 1.01 or more and 1.04 or less).

As described hereinabove, such a D/B ratio can be easily adjusted and controlled by adjusting the winding tension, and the like, during the winding process and adjusting the constraint pressure after constructing the battery pack.

Although the shape of the wound electrode body 20 disclosed herein is not particularly limited, provided it is a flat shape, it is desired that the wound electrode body 20 be used that has a plain flat shape such that, as shown in FIG. 4, the thickness of the flat F portion 24 along the flat center line L (that is, the distance between the two inner curve apexes V) is larger than the total thickness of the two curved R portions 22a and 22b along the flat center line L (that is, 2×(center thickness D of the curved R portion)).

In order to accommodate easily the wound electrode body 20 of such a form in the case body, it is desirable that the width size (inner diameter) corresponding to the thickness direction of the electrode body in the battery case 30 be not less than twice the center thickness D of the curved R portion.

Test examples relating to the present teaching will be described hereinbelow, but the present teaching is not intended to be limited to the configurations shown in the test examples (Examples). Lithium ion secondary batteries for evaluation tests according to Examples 1 to 8 shown in Table 1 were constructed by using the materials and processes described below.

Example 1

The positive electrode was fabricated by the following procedure. A spinel-type high-potential positive electrode active material powder: $LiNi_{0.5}Mn_{1.5}O_4$ (LNM) prepared by mixing lithium phosphate ($Li_3PO_4$) as an inorganic phosphate in advance at a ratio of 2.5 parts (2.50%) per 100 parts (100%) of the active material, AB as an electrically conductive material, and PVDF as a binder were mixed with NMP at a mass ratio of LNM:AB:PVDF=90:8:2 to prepare a slurry-like composition for forming an active material layer. This composition was stripe-like coated on both sides of an elongated aluminum foil (positive electrode current collector) having a thickness of 15 μm, dried and pressed to fabricate a positive electrode sheet. The density of the positive electrode active material layer was 2.35 g/cm$^3$.

The negative electrode was fabricated by the following procedure. Graphite (C) coated on the surface with amorphous carbon was prepared as a negative electrode active material powder. Then, the graphite (C), a SBR as a binder, and CMC as a thickener were mixed with ion-exchanged water at a mass ratio of C:SBR:CMC=98:1:1 to prepare a slurry-like composition for forming a negative electrode active material layer. This composition was stripe-like coated on both sides of an elongated copper foil (negative electrode current collector) having a thickness of 10 μm, dried and pressed to fabricate a negative electrode sheet. The density of the negative electrode active material layer was 1.20 g/cm$^3$.

The positive electrode sheet and the negative electrode sheet fabricated as described hereinabove were laminated in the longitudinal direction with two separator sheets being interposed therebetween. Each separator sheet had a four-layer structure in which a porous polypropylene layer was formed on both surfaces of a porous polyethylene layer and then a layer (the so-called heat-resistant layer) composed of an alumina powder and a binder was formed on the surface of one polypropylene layer. The laminate was wound in a flat shape by about 30 turns in the longitudinal direction while appropriately adjusting the winding tension by a commercially available winding machine, and a wound electrode body according to this example was obtained.

Next, the obtained wound electrode body was accommodated inside a battery case, a nonaqueous electrolytic solution was poured from the opening of the battery case, and the opening was sealed. The nonaqueous electrolytic solution was prepared by dissolving $LiPF_6$ as a supporting salt to a concentration of 1.1 mol/L in a mixed solvent including EC, EMC, and DMC at a volume ratio of EC:EMC:DMC=30: 40:30 and then including $LiB(C_2O_4)_2$ as an additive so as to obtain a concentration of approximately 0.05 mol/L.

Then, a constraint band and an auxiliary tool (see FIG. 1) were attached to the outer side surface (wide surface) of the battery case and a constraint pressure was applied from the outside of the case in the direction toward the flat surface of the wound electrode body in the battery case to fabricate a lithium ion secondary battery for evaluation test according to Example 1 in which the D/B ratio in the wound electrode body in the battery case after the constraining was 1.00.

Examples 2 to 8

Lithium ion secondary batteries for evaluation tests according to Examples 2 to 7 were fabricated using the same materials and manufacturing process as in Example 1, except that the D/B ratio in the wound electrode body in the battery case after the constraining was controlled in a range of 1.01 to 1.08, as shown in Table 1, by appropriately adjusting the winding tension at the time of winding and the constraint pressure at the time of constraining.

Further, a lithium ion secondary battery for evaluation tests according to Example 8 with a D/B ratio of 1.08 was fabricated using the same materials and manufacturing process as in Example 7, except that a spinel type high-potential positive electrode active material (LNM) powder material not containing the inorganic phosphate ($Li_3PO_4$) was used.

TABLE 1

| Test battery | Amount of $Li_3PO_4$ added (active material 100%) | Density of positive electrode active material layer (g/cm³) | Density of negative electrode active material layer (g/cm³) | D/B ratio after battery constraining |
|---|---|---|---|---|
| Example 1 | 2.50 | 2.35 | 1.20 | 1.00 |
| Example 2 | 2.50 | 2.35 | 1.20 | 1.01 |
| Example 3 | 2.50 | 2.35 | 1.20 | 1.02 |
| Example 4 | 2.50 | 2.35 | 1.20 | 1.04 |
| Example 5 | 2.50 | 2.35 | 1.20 | 1.06 |
| Example 6 | 2.50 | 2.35 | 1.20 | 1.07 |
| Example 7 | 2.50 | 2.35 | 1.20 | 1.08 |
| Example 8 | Not added | 2.33 | 1.18 | 1.08 |

<High Rate Charge/Discharge Cycle Test: Measurement of Capacity Retention Ratio>

The constrained lithium ion secondary batteries of Examples 1 to 8 which were fabricated in the above-described manner were subjected to a high-rate charge/discharge cycle test by applying a charge/discharge pattern including repeated high-rate charging and discharging.

Specifically, conditioning treatment was performed with respect to the battery of each Example under the temperature condition of 25° C. by repeating three times the operation of constant-current charging at a rate of ⅓C up to 4.9 V, stopping for 10 min, then constant-current discharging at a rate of ⅓C to 3.5 V, and stopping for 10 min. The discharge capacity at this time was measured and taken as the initial capacity.

Then, the SOC of each battery was adjusted to 80% in an environment of −10° C., and the batteries were subjected to 500 cycles of high-rate rectangular-wave charging and discharging, each cycle including charging for 10 sec at 200 A and then discharging. The ratio of capacity after 500 cycles to the initial capacity was taken as the capacity retention ratio (%). The results are shown in the corresponding column of Table 2.

Further, the SOC of each of other constrained lithium ion secondary batteries of Examples 1 to 8 which were fabricated in the above-described manner was adjusted to 80% in an environment of 25° C. after the conditioning treatment, and the batteries were subjected to 500 cycles of high-rate rectangular-wave charging and discharging, each cycle including charging for 10 sec at 200 A and then discharging. The resistance increase rate (%) was then calculated from the IV resistance before the charge/discharge cycle test (the initial resistance of the battery) and the IV resistance after the charge/discharge cycle test. Here, the resistance increase rate (%) was obtained from [IV resistance after the charge/discharge cycle test/IV resistance before the charge/discharge cycle test]. The results are shown in the corresponding column of Table 2.

TABLE 2

| Test battery | D/B ratio | Capacity retention ratio (%) | Resistance increase rate (%) |
|---|---|---|---|
| Example 1 | 1.00 | 71.0 | 1.02 |
| Example 2 | 1.01 | 92.3 | 1.02 |
| Example 3 | 1.02 | 99.4 | 1.02 |
| Example 4 | 1.04 | 92.3 | 1.02 |
| Example 5 | 1.06 | 80.2 | 1.06 |
| Example 6 | 1.07 | 78.1 | 1.09 |
| Example 7 | 1.08 | 71.0 | 1.22 |
| Example 8 | 1.08 | 99.1 | 1.20 |

As is apparent from the results shown in Table 2, in the lithium ion secondary batteries according to Examples 2 to 6 in which the D/B ratio was adjusted to 1.01 or more and 1.07 or less, the capacity retention ratio clearly could be improved as compared with that of the lithium ion secondary batteries of Examples 1 and 7 in which the D/B ratio was not adjusted to the aforementioned range. The effect of improving the capacity retention ratio was particularly remarkable in the lithium ion secondary batteries according to Examples 2 to 4 in which the D/B ratio was 1.01 or more and 1.04 or less. Further, when the D/B ratio is 1.08 or more, the rate of increase of the IV resistance increases, which is undesirable from the viewpoint of battery performance and durability. From the comparison of Examples 7 and 8, it is clear that the adjustment of the D/B ratio disclosed herein can exert a remarkable effect when an inorganic phosphate such as lithium phosphate is included in the positive electrode active material layer.

A battery pack including a plurality of the lithium ion secondary batteries disclosed herein as a unit batteries can be used for various purposes, but since the battery pack combines high battery performance with durability, the battery pack can be advantageously used as, for example, a power source (driving power supply) for a vehicle.

What is claimed is:

1. A battery pack comprising a plurality of lithium ion secondary batteries which are arranged in a predetermined direction and constrained in a state in which a constraint pressure is applied in the arrangement direction, wherein
each of the plurality of the lithium ion secondary batteries includes:
a flat-shaped wound electrode body in which a sheet-shaped positive electrode including a positive electrode active material layer on an elongated positive electrode current collector, a sheet-shaped negative electrode including a negative electrode active material layer on an elongated negative electrode current collector, and an elongated separator sheet that electrically insulates the sheet-shaped positive and negative electrodes from each other are laminated and wound in a longitudinal direction;
a nonaqueous electrolytic solution; and
a battery case of a rectangular parallelepiped shape corresponding to the flat shape of the wound electrode body,
the positive electrode active material layer includes a positive electrode active material and at least one inorganic phosphate as a compound different from the positive electrode active material,
a thickness of the positive electrode active material layer is 50 µm or more,
a thickness of the negative electrode active material layer is 50 µm or more,
the wound electrode body is constituted, in a lateral cross section of the electrode body orthogonal to a winding central axis, by two curved R portions enclosing respective curved outer surfaces at both ends and a flat F portion enclosing a flat outer surface located between the two curved R portions,
a winding number of the wound electrode body is 20 to 50 turns,
the plurality of the lithium ion secondary batteries are constrained in a state in which the wound electrode body and the nonaqueous electrolytic solution are accommodated in the battery case of each battery, the batteries are arranged so that the flat surfaces of the wound electrode bodies inside the cases face each other, and the constraint pressure is applied in the arrangement direction,
in each of the plurality of the constrained lithium ion secondary batteries, when, in the lateral cross section of the wound electrode body,
a straight line connecting outer curve apexes P located on respective outer surfaces of the two curved R portions is defined as a flat center line L, and
a straight line which is orthogonal to the flat center line L and passes through an inner curve apex V of the positive electrode or the negative electrode, the inner curve apex V being on the innermost side of each of the two curved R portions, is defined as an R portion/F portion boundary line W, the following condition is satisfied:
a D/B ratio is 1.01 or more and 1.07 or less, where, in the lateral cross section of the wound electrode body,
a thickness from the inner curve apex V to the outer curve apex P is taken as a center thickness D of the curved R portion, and
a thickness from the inner curve apex V to an outer surface S of the wound electrode body along the R portion/F portion boundary line W is taken as a boundary thickness B of the curved R portion, and
the positive electrode active material layer includes a high-potential positive electrode active material having an open circuit voltage (OCV) of 4.3 V or higher as a positive electrode active material.

2. The battery pack according to claim 1, wherein the DB ratio is 1.01 or more and 1.04 or less.

3. The battery pack according to claim 1, wherein the thickness of the positive electrode active material layer is 50 µm or more and 200 µm or less, and the thickness of the negative electrode active material layer is 50 µm or more and 200 µm or less.

4. The battery pack according to claim 1, wherein the thickness of the positive electrode active material layer is 50 µm or more and 100 µm or less, and the thickness of the negative electrode active material layer is 50 µm or more and 100 µm or less.

5. A lithium ion secondary battery for constructing a battery pack including a plurality of the lithium ion secondary batteries which are arranged in a predetermined direction and constrained in a state in which a constraint pressure is applied in the arrangement direction, the lithium ion secondary battery comprising:
a flat-shaped wound electrode body in which a sheet-shaped positive electrode including a positive electrode active material layer on an elongated positive electrode current collector, a sheet-shaped negative electrode including a negative electrode active material layer on an elongated negative electrode current collector, and an elongated separator sheet that electrically insulates the sheet-shaped positive and negative electrodes from each other are laminated and wound in a longitudinal direction;
a nonaqueous electrolytic solution; and
a battery case of a rectangular parallelepiped shape corresponding to the flat shape of the wound electrode body, wherein
the positive electrode active material layer includes a positive electrode active material and at least one inorganic phosphate as a compound different from the positive electrode active material,
a thickness of the positive electrode active material layer is 50 µm or more,
a thickness of the negative electrode active material layer is 50 µm or more,
the wound electrode body is constituted, in a lateral cross section of the electrode body orthogonal to a winding central axis, by two curved R portions enclosing respective curved outer surfaces at both ends and a flat F portion enclosing a flat outer surface located between the two curved R portions,
a winding number of the wound electrode body is 20 to 50 turns,
when, in the lateral cross section of the wound electrode body,
a straight line connecting outer curve apexes P located on respective outer surfaces of the two curved R portions is defined as a flat center line L, and
a straight line which is orthogonal to the flat center line L and passes through an inner curve apex V of the positive electrode or the negative electrode, the inner curve apex V being on the innermost side of each of the two curved R portions, is defined as an R portion/F portion boundary line W,
the following condition is satisfied in a state in which the wound electrode body and the nonaqueous electrolytic solution are accommodated in the battery case and a constraint pressure is applied from the outside of a case side surface facing the flat surface of the wound electrode body in the direction toward the flat surface under the same conditions as the conditions when the battery pack is constructed:
- a D/B ratio is 1.01 or more and 1.07 or less, where, in the lateral cross section of the wound electrode body,
- a thickness from the inner curve apex V to the outer curve apex P is taken as a center thickness D of the curved R portion,
- a thickness from the inner curve apex V to an outer surface S of the wound electrode body along the R portion/F portion boundary line W is taken as a boundary thickness B of the curved R portion, and the positive electrode active material layer includes a high-potential positive electrode active material having an open circuit voltage (OCV) of 4.3 V or higher as a positive electrode active material.

6. The lithium ion secondary battery according to claim 5, wherein the D/B ratio in a state in which a constraint pressure is applied in the direction toward the flat surface under the same conditions as the conditions when the battery pack is constructed is 1.01 or more and 1.04 or less.

7. The lithium ion secondary battery according to claim 5, wherein the thickness of the positive electrode active material layer is 50 μm or more and 200 μm or less, and the thickness of the negative electrode active material layer is 50 μm or more and 200 μm or less.

8. The lithium ion secondary battery according to claim 5, wherein the thickness of the positive electrode active material layer is 50 μm or more and 100 μm or less, and the thickness of the negative electrode active material layer is 50 μm or more and 100 μm or less.

* * * * *